(No Model.)

E. L. RANSOME.
MOLDING CONCRETE PIPE.

No. 515,016.      Patented Feb. 20, 1894.

Witnesses
Ross F. Tucker
Geo. J. Kelley

Inventor
Ernest Leslie Ransome

THE NATIONAL LITHOGRAPHING COMPANY,
WASHINGTON, D. C.

UNITED STATES PATENT OFFICE.

ERNEST LESLIE RANSOME, OF OAKLAND, CALIFORNIA.

MOLDING CONCRETE PIPE.

SPECIFICATION forming part of Letters Patent No. 515,016, dated February 20, 1894.

Application filed March 28, 1893. Serial No. 468,049. (No model.)

*To all whom it may concern:*

Be it known that I, ERNEST LESLIE RANSOME, a citizen of the United States, residing at Oakland, in the county of Alameda and State of California, have invented an Improvement in Molding Concrete Pipe; and I hereby declare the following to be a full, clear, and exact description of the same.

My invention relates to the core-mold used in the construction of monolithic, continuous pipe *in situ*. It is especially adapted for the system and molds for which Letters Patent No. 352,500 of November 30, 1886, and No. 424,656 of April 1, 1890, were granted me, and for which I now have several applications pending.

It consists of a core-mold made in detachable sections and of the manner of placing and working the same, all of which will be more fully explained by reference to the accompanying drawings in which—

Figure 2:
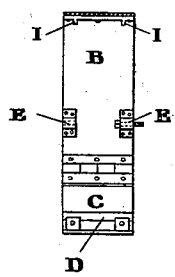
Figure 1:
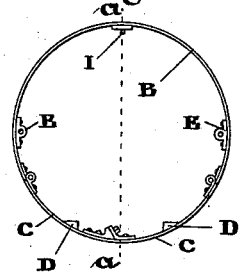
Figure 3:
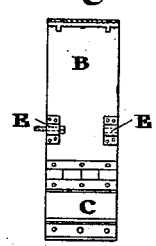
Figure 4:
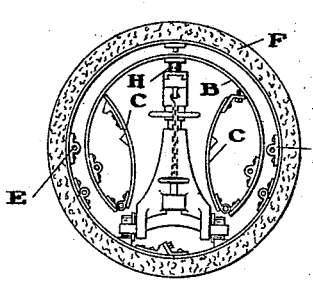
Figure 5:
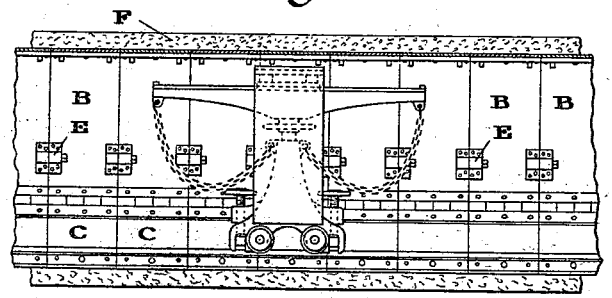
Figure 6:
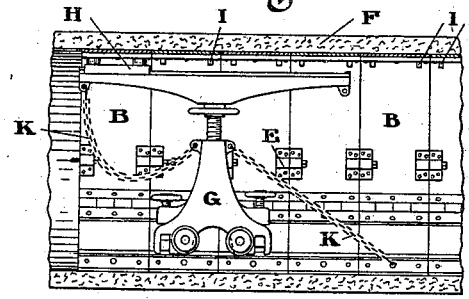
Figure 7:
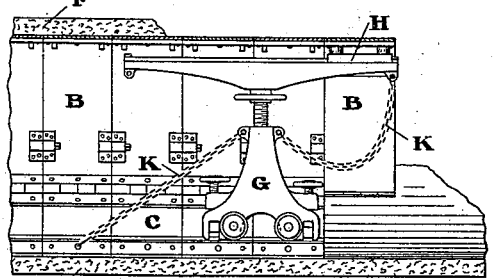

Figure 1. is an end view of the mold. Figs. 2 and 3, are right and left sectional views of a mold section taken on line "*a a.*" Fig. 4, shows rear end of mold in a concrete pipe with a section thereof on a truck ready for removal to the front. Fig. 5, shows longitudinal section of mold in pipe with one of its sections placed on a truck on its way to the front. Fig. 6, shows position of the truck in receiving a section. Fig. 7, shows position of the truck in setting a section.

Similar letters refer to similar parts throughout the several drawings, in which—

B. is a mold section.
C. is a mold section door.
D. is a truck rail.
E. is a guide-pin coupling.
F. is a concrete pipe in course of formation.
G. is a truck.
H. is a block sliding or rolling on truck arms.
I. is a truck block pin.
K. is a stay chain.

This invention is applicable only to large structures in which men can move with comparative freedom.

The mold is constructed of a number of sections, each section consisting of a cylindrically shaped figure, the outline or periphery of which corresponds with the inner contour of the structure to be molded. By preference I make the section in three parts namely, the main piece "B," and the two doors "C C," which are hinged to "B" as shown, rails "D" for truck "G" are bolted or otherwise fastened to sections "B," also guide-pin-couplings "E" and pins "I" for entering truck block "H," are placed as shown.

In operation, concrete for the commencement of the lower part of the pipe having already been molded, and the ditch mold being in active progress, the mold sections "B" having their doors fast closed are placed in position one after another about as quickly as needed to keep up with the ditch mold. They are set in the ditch upon the soft concrete just molded. Each section as soon as set in place, is coupled to the one adjoining by any of the usual couplings and guide-pins. When a sufficient length of this mold has been placed and coupled together, and when the concrete of the pipe has been formed around it, sufficiently long, so that the concrete has set at the rear end of the mold, and while the concrete is being molded about its forward part, truck "G" is placed upon the tramway formed by the rails "D" and run to the rear until its rear arm is under the first section placed, where the truck is stayed by blocking up the rear wheels by attaching stay chain "K" to one of the forward sections or by any other suitable means. The sliding block "H" is adjusted to receive the pins "I" and the truck arms are raised up by a screw or other suitable means until the pins "I" are engaged by the holes in the truck block "H" and the block is tight up to the crown of the section. The section doors are then opened and the section is uncoupled from the next one. Then the truck arms are lowered sufficiently to clear the section which they carry from contact with the other sections; to aid in which, the pendent sides of the section can be drawn toward one another and fastened by rod or chain; but usually the natural sag of the section when resting upon the truck is sufficient. Being moved to the center of the truck, the section is then wheeled to the front and pushed out and reared on the forward arm sufficiently to bring it into position, the truck being stayed in a similar manner as before. The doors "C" are then closed and secured in place as at first. This action is repeated as often as necessary. In place of a pair of doors, one door can be used. These may be hinged or not as desired, but unless hinged more work is necessary in hauling the pieces separately.

Having thus described my invention, what I claim is—

1. A mold consisting of a row of detachable cylindrical arch pieces, each piece having the opening at its base closed by a door or doors substantially as described.

2. A mold consisting of a row of detachable cylindrical arch pieces, each piece having a door or doors at its base and rails attached, substantially as described.

3. The method of continuous molding which consists in detaching the rear section of the mold, carrying it through the mold and reattaching it thereto in front while the structure is being formed about the mold, substantially as described.

4. The method of continuous molding which consists in detaching the rear section of the mold direct upon a traveler, conveying it thereon through the mold and placing it against and connecting it to the front section direct from the traveler while the structure is in process of formation about the mold, substantially as described.

ERNEST LESLIE RANSOME.

Witnesses:
F. LESLIE RANSOME,
HARRY T. INGERSON.